March 29, 1960

G. CHIZALLET ET AL 2,930,838

FIREPROOF ELECTRICAL INSULATION

Filed Sept. 20, 1957

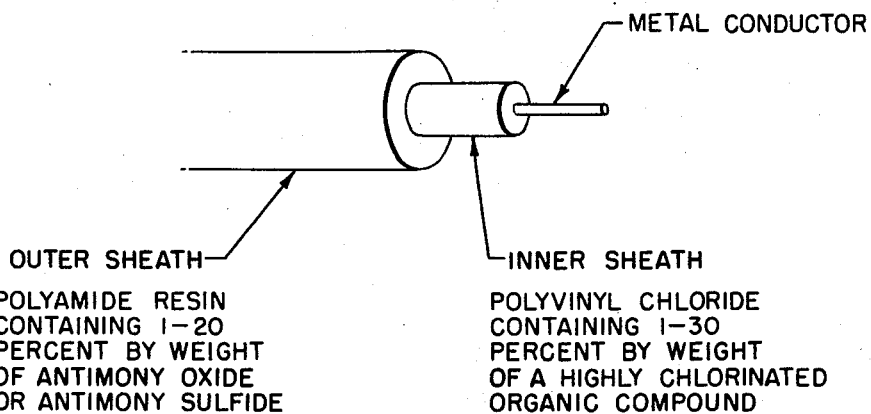

OUTER SHEATH

POLYAMIDE RESIN
CONTAINING 1-20
PERCENT BY WEIGHT
OF ANTIMONY OXIDE
OR ANTIMONY SULFIDE

METAL CONDUCTOR

INNER SHEATH

POLYVINYL CHLORIDE
CONTAINING 1-30
PERCENT BY WEIGHT
OF A HIGHLY CHLORINATED
ORGANIC COMPOUND

*INVENTORS*
GEORGES CHIZALLET
ROGER DUMON
BY

KENWAY, JENNEY, WITTER & HILDRETH

ATTORNEYS

United States Patent Office 2,930,838
Patented Mar. 29, 1960

2,930,838

FIREPROOF ELECTRICAL INSULATION

Georges Chizallet, La Courneuve, and Roger Dumon, Paris, France, assignors to Organico, S.A., Paris, France, a corporation of France Application September 20, 1957, Serial No. 685,064

Claims priority, application France September 25, 1956

6 Claims. (Cl. 174—120)

This invention consists in a novel fireproof electrical insulation and in electrical conductors insulated therewith.

A well-known type of electrical insulation consists in an inner relatively thick sheath of a flexible thermoplastic material surrounded by an outer relatively thin sheath of a synthetic linear polyamide resin. Insulation of this type is particularly advantageous in that it is of low density, is highly resistant to abrasion, and is chemically inert and moisture resistant. The usefulness of this type of insulation has, however, been limited by the fact that it is not fireproof and accordingly may not be used in installations where it would create a dangerous fire hazard, for instance, in airplane and shipboard use.

An obstacle to rendering insulation of this type fireproof lies in the fact that known additives for making plastic materials fireproof may not satisfactorily be incorporated in the polyamide resin without deleterious results. A common and particularly satisfactory means of rendering plastic materials fireproof is to add antimony oxide or antimony sulphide together with a highly chlorinated organic material to the plastic. It has been found, however, that when these materials are added to polyamide resins they become brittle, breakable, and difficult to extrude.

The present invention is based on the discovery of a manner of incorporating fire-resisting additives to electrical insulation employing an outer layer of polyamide resin covering an inner layer of some other organic plastic material. The invention consists of adding the highly chlorinated organic compound to the organic plastic material of the inner layer to produce a mixture which is thermally decomposable to hydrogen chloride and of adding antimony oxide or antimony sulphide to the polyamide resin forming the outer layer.

Highly chloridnated organic compounds which may be used as fireproofing additives for organic resins to form mixtures thermally decomposable to hydrogen chloride, are for the most part well known in the art, examples being hexachlorobenzene and hexachloroethane as well as other organic compounds containing a high percentage of chlorine and which are compatible with the plastic material may also be used. Typically the inner layer will be composed principally of polyvinyl chloride, plasticized to provide the requisite flexibility, and from 1–30 percent (most preferably 5–15 percent) by weight of the chlorinated organic compound. The materials forming the inner layer will be prepared for extrusion in conventional manner, as by kneading, calendering and rolling, and it has been found that the mixture of resin and chlorinated organic compound is sufficiently stable at the extrusion temperature and is easily worked on the rolling mill and calender.

The outer layer will consist typically of a polyamide resin, such as the polymer of 11-aminoundecanoic acid, and from about 1–20 percent (most preferably 3–10 percent) by weight of antimony oxide or antimony sulphide. These ingredients may easily be combined either during polymerization, or by dry mixing and rolling, or if desired, even during the extrusion process by feeding the ingredient separately into the extruder.

Conductors insulated in the manner of this invention are formed by conventional techniques employing the two materials described above, as by passing the conductor through a wire coating extruder in which is applied the inner layer of vinylchloride and chlorinated hydrocarbon and in then extruding the outer layer of polyamide over the inner layer. The insulated cable thus formed may be exposed directly to the flame of a Bunsen burner without burning. By way of hypothesis, it is suggested that the heat of any flame to which the insulation is exposed results in the liberation of hydrogen chloride from the inner thermoplastic layer and that the hydrogen chloride then reacts with the antimony oxide or antimony sulphide of the outer polyamide layer to form a fireproofing compound such as antimony oxichloride.

The preferred embodiment of this invention is described in detail in the following example:

*Example*

The inner coating composition was prepared by milling together:

| | Parts by weight |
|---|---|
| Polyvinylchloride | 100 |
| Tricresyl phosphate (plasticizer) | 50 |
| Dibasic lead sulphate | 7 |
| Extrusion lubricant material | 1 |
| Kaolin clay | 15 |
| Hexachloroethane | 12 |

After the ingredients were thoroughly mixed together the mixture was calendered and then extruded onto a copper wire 1 mm. in diameter to form a layer 0.6 mm. in thickness.

The outer coating composition was prepared by mixing together in a Werner blender 100 parts by weight of Rilsan polyamide resin (polymer of 11-aminoundecanoic acid) and 4 parts by weight of antimony oxide. This mixture was then charged into an extruder and applied as an outer coating to the inner layer of plasticized polyvinyl chloride as a layer having a thickness of 0.15 mm.

The insulated cable as thus formed is shown in the accompanying drawing.

The insulation thus formed was found to be of excellent resistivity and dielectric rigidity and to be tough and durable so as to resist friction, tension and impacts. When placed vertically above the flame of a Bunsen burner, there was no tendency for the flame to propagate and upon removal of the cable from the flame the cable was completely extinguished in a matter of seconds.

By way of comparison it is noted that if the polyvinyl chloride layer alone is rendered fireproof by the addition of chlorinated hydrocarbons and antimony oxide or sulphide the superposed layer of polyamide resin will readily burn on contact with a flame.

Although the invention has been described in detail with reference to its preferred embodiment it is contemplated that numerous modifications will occur to those skilled in the art and familiar with this disclosure and that such may be made without departing from the scope of this invention.

Having thus disclosed this invention and described in detail the presently preferred embodiments thereof, we claim and desire to secure by Letters Patent:

1. Fireproof insulation comprising in combination a first layer comprising polyvinyl chloride and an adjacent contacting layer comprising a synthetic linear polyamide resin, and a fire retardant combination of a highly chlorinated organic compound and an antimony compound selected from the group consisting of antimony oxide and antimony sulfide, said highly chlorinated organic compound being in an amount of from 1–30 percent of the weight of said first layer and being entirely incorporated in said first layer, and said antimony compound being in an amount of from 1–20 percent of the weight of the adjacent layer and being entirely incorporated in said adjacent layer.

2. The fireproof insulation defined by claim 1 wherein the highly chlorinated organic compound is selected from the group consisting of hexachlorobenzene and hexachloroethane.

3. A fireproof insulated cable comprising in combination a conductor, an inner insulating sheath covering said conductor comprising polyvinyl chloride, an outer insulating sheath overlying said inner insulating sheath comprising a synthetic linear polyamide resin, and a fire retardant combination of highly chlorinated organic compound and an antimony compound selected from the group consisting of antimony oxide and antimony sulfide incorporated in said sheaths, the highly chlorinated organic compound being in an amount of from 1–30 percent of the weight of said inner sheath and being incorporated entirely in said inner sheath and said antimony compound being in an amount of from 1–20 percent of the weight of said outer sheath and being incorporated entirely in said outer sheath.

4. The fireproof insulated cable defined by claim 3 in which the highly chlorinated organic compound is selected from the group consisting of hexachlorobenzene and hexachloroethane.

5. Fireproof insulation comprising in combination a first layer comprising polyvinyl chloride and an adjacent contacting layer comprising a synthetic linear polymer of 11-aminoundecanoic acid, and a fire retardant combination of a highly chlorinated organic compound selected from the group consisting of hexachloroethane and hexachlorobenzene and an antimony compound selected from the group consisting of antimony oxide and antimony sulfide, said highly chlorinated organic compound being in an amount of from 5–15 percent of the weight of said first layer and being entirely incorporated therein, and said antimony compound being in an amount of from 3–10 percent of the weight of said adjacent layer and being entirely incorporated therein.

6. A fireproof insulated cable comprising in combination a conductor, an inner insulating sheath covering said conductor comprising polyvinyl chloride, an outer insulating sheath overlying said inner insulating sheath comprising a synthetic linear polymer of 11-aminoundecanoic acid, and a fire retardant combination of a highly chlorinated organic compound selected from the group consisting of hexachloroethane and hexachlorobenzene, and an antimony compound selected from the group consisting of antimony oxide and antimony sulfide, said highly chlorinated organic compound being in an amount of from 5–15 percent of the weight of said inner sheath and being entirely incorporated therein, and said antimony compound being in an amount of from 3–10 percent of the weight of said outer sheath and being entirely incorporated therein.

References Cited in the file of this patent

UNITED STATES PATENTS

| | | |
|---|---|---|
| 2,349,952 | Fuller | May 30, 1944 |
| 2,413,163 | Bacon | Dec. 24, 1946 |
| 2,480,298 | Happoldt | Aug. 30, 1949 |
| 2,590,211 | Rugar | Mar. 25, 1952 |
| 2,669,521 | Bierly | Feb. 16, 1954 |

FOREIGN PATENTS

| | | |
|---|---|---|
| 761,672 | Great Britain | Nov. 21, 1956 |